(12) United States Patent
Cracraft (10) Patent No.: US 11,744,179 B2
(45) Date of Patent: Sep. 5, 2023

(54) ACCUMULATOR CONTENTS DETECTION SYSTEM FOR HARVESTER

(71) Applicant: DEERE & COMPANY, Moline, IL (US)

(72) Inventor: Mark A. Cracraft, Johnston, IA (US)

(73) Assignee: DEERE & COMPANY, Moline, IL (US)

( * ) Notice: Subject to any disclaimer, the term of this patent is extended or adjusted under 35 U.S.C. 154(b) by 524 days.

(21) Appl. No.: 16/815,550

(22) Filed: Mar. 11, 2020

(65) Prior Publication Data

US 2021/0282318 A1 Sep. 16, 2021

(51) Int. Cl.
*A01D 41/127* (2006.01)
*A01F 15/07* (2006.01)
*A01F 15/10* (2006.01)
*A01F 15/08* (2006.01)

(52) U.S. Cl.
CPC ..... *A01D 41/1271* (2013.01); *A01D 41/1274* (2013.01); *A01F 15/071* (2013.01); *A01F 15/0825* (2013.01); *A01F 15/0875* (2013.01); *A01F 15/106* (2013.01); *A01F 2015/076* (2013.01)

(58) Field of Classification Search
CPC ............ A01D 41/1271; A01D 41/1274; A01D 43/077; A01D 59/02; A01F 15/071; A01F 15/0825; A01F 15/0875; A01F 2015/076; A01F 15/08; G01L 3/00; G01D 21/02
See application file for complete search history.

(56) References Cited

U.S. PATENT DOCUMENTS

| | | | | |
|---|---|---|---|---|
| 3,999,674 A | * | 12/1976 | Meitl | A01F 29/005 241/101.76 |
| 6,263,650 B1 | * | 7/2001 | Deutsch | A01D 46/082 56/16.4 B |
| 6,431,981 B1 | * | 8/2002 | Shinners | A01D 43/085 460/6 |
| 8,844,251 B2 | | 9/2014 | Rumohr et al. | |
| 9,622,408 B1 | * | 4/2017 | Miller | A01D 46/085 |
| 2009/0107348 A1 | * | 4/2009 | Noonan | A01D 87/127 100/8 |
| 2010/0314221 A1 | * | 12/2010 | Garberson | B65G 43/00 198/810.01 |
| 2014/0169932 A1 | * | 6/2014 | Farley | B60P 1/42 414/813 |

(Continued)

FOREIGN PATENT DOCUMENTS

EP 2786652 A1 10/2014
WO WO-2015065173 A1 * 5/2015 ......... A01F 15/0715

OTHER PUBLICATIONS

Gairns, "How Do We Pick Cotton?—Version 2—Baler Pickers," <https://www.youtube.com/watch?v=EPFGgThMe-k> YouTube video published on May 14, 2013.

*Primary Examiner* — Arpad F Kovacs
(74) *Attorney, Agent, or Firm* — Taft Stettinius & Hollister LLP; Stephen F. Rost (57) ABSTRACT

An accumulator contents detection system for a harvester includes an accumulator, a plurality of metering rollers, and at least one sensor. The accumulator accumulates crop material. The plurality of metering rollers receives crop material from the accumulator. The plurality of metering rollers includes a drive metering roller. The at least one sensor detects a load transmitted to the drive metering roller.

22 Claims, 9 Drawing Sheets

(56) References Cited

U.S. PATENT DOCUMENTS

| | | |
|---|---|---|
| 2016/0120126 A1 | 5/2016 | Weber |
| 2017/0071127 A1* | 3/2017 | Cracraft ................. A01D 46/10 |
| 2017/0112060 A1* | 4/2017 | Noonan ................. A01D 69/03 |
| 2019/0289787 A1* | 9/2019 | Heitmann .......... A01D 41/1271 |

* cited by examiner

ACCUMULATOR CONTENTS DETECTION SYSTEM FOR HARVESTER

BACKGROUND

The present disclosure generally relates to a harvester and more particularly to an accumulator contents detection system for a harvester.

In order to provide a compact bale, harvesters commonly include an on-board bale forming structure (or baler) or other crop material processing structure. An accumulator typically provides a supply of crop material to a conveyor, and the conveyor provides the supply of crop material to the baler.

SUMMARY

In one aspect, the disclosure provides an accumulator contents detection system for a harvester. The system includes an accumulator, plurality of metering rollers, and at least one sensor. The accumulator accumulates crop material. The plurality of metering rollers receives crop material from the accumulator. The metering rollers include a drive metering roller. The at least one sensor detects a load transmitted to the drive metering roller.

In another aspect, the disclosure provides a method of metering crop material from an accumulator of a harvester. The method includes receiving crop material from the accumulator to a plurality of metering rollers, carrying crop material with the metering rollers, detecting a quantity of crop material carried by the metering rollers indirectly by detecting a load transmitted to a drive metering roller of the metering rollers, and comparing the load transmitted to the drive metering roller to a predetermined range.

In another aspect, the disclosure provides a computer readable medium having stored thereon a program for operating a harvester. The program is executable by a controller such that the controller initiates operation of a drive unit to drive a drive metering roller, receives load data related to a load transmitted to the drive metering roller, compares the load data to a predetermined range, and stops operation of the drive unit if the load data is outside of the predetermined range.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits (ASICs). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
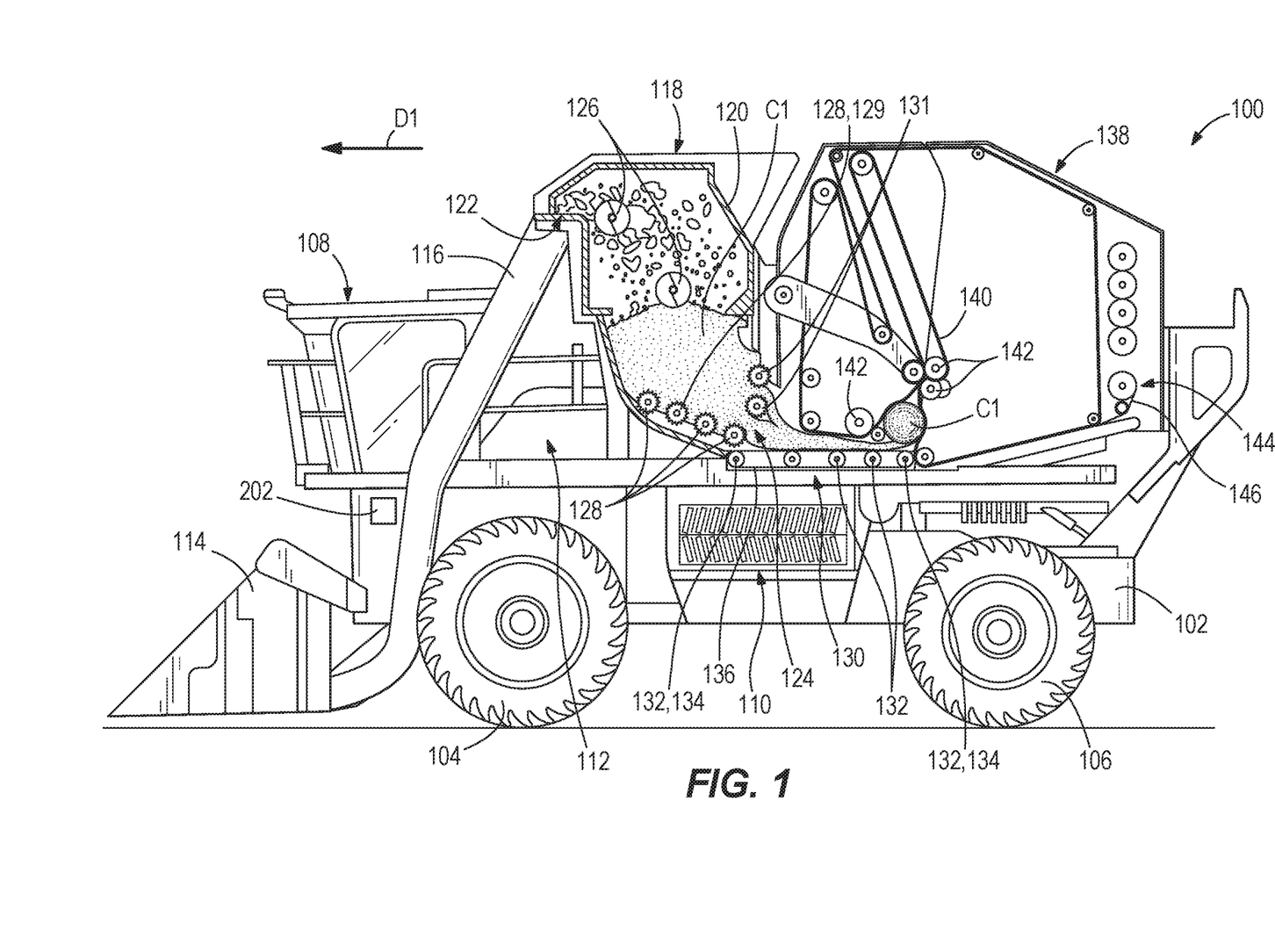
FIG. 1 illustrates a side elevation cross-sectional view of a harvester according to an embodiment of the disclosure.

FIG. 1 illustrates a harvester 100 including a chassis 102. The chassis 102 is illustrated as being supported by front wheels 104 and rear wheels 106. The harvester 100 is adapted for movement in a direction D1 through a field to harvest crop material C1. An operator station 108 is supported by the chassis 102. A power module 110 is supported below the chassis 102. Water, lubricant, and/or fuel tanks are indicated generally at 112. The tanks 112 are supported by the chassis 102.

A harvesting header 114 is couplable to the chassis 102. The harvesting header 114 is configured to remove crop material C1 from the field. The harvesting header 114 may be a stripper row unit, a picker row unit, or the like.

A duct 116 is in communication with the harvesting header 114. The duct 116 is configured for receiving crop material C1 from the harvesting header 114. In the illustrated embodiment, the duct 116 is part of an air duct system.

An accumulator 118 is in communication with the duct 116 to receive crop material C1 from the duct 116. The accumulator 118 includes a storage frame 120 for storing the crop material C1. The storage frame 120 has an accumulator inlet 122 (at the upper portion of the accumulator 118 in the illustrated embodiment) and an accumulator outlet 124 (at the lower portion of the accumulator 120 in the illustrated embodiment). The accumulator inlet 122 receives the crop material C1 from the duct 116. The accumulator 118 further includes one or more compactor augers 126 to disburse and/or compact the crop material C1 laterally in the storage frame 120. The accumulator 118 also includes a plurality of metering rollers 128 to direct the crop material C1 through the accumulator outlet 124. Of the plurality of metering rollers 128, at least one metering roller 128 is also a drive metering roller 129. The metering rollers 128 further include gears (shown in FIG. 4) coupled to each of the metering rollers 128 to indirectly drive each of the metering rollers 128 with the drive metering roller 129. Further, the illustrated embodiment also includes a plurality of beater rollers 131. The beater rollers 131 at least partially beat, or break up, the crop material C1 so a light, non-dense matte of crop material C1 is provided downstream to assist in later baling the crop material C1.

A feed conveyor 130 is in communication with the accumulator 118 to receive crop material C1 from the accumulator outlet 124. The feed conveyor 130 includes a plurality of feed rollers 132. At least one of the feed rollers 132 is also a drive feed roller 134. The feed conveyor 130 further includes a belt 136 routed around the plurality of feed rollers 132. The illustrated embodiment includes two drive feed rollers 134, each of which is located at a respective end of the feed conveyor 130 to drive the belt 136.

A baler 138 is in communication with the feed conveyor 130 to receive crop material C1 from the feed conveyor 130. In the illustrated embodiment, the baler 138 is coupled to the harvester 100. Alternative embodiments may include the baler 138 coupled to a different work vehicle, such as a tractor. The baler 138 may be integrally coupled to the different work vehicle, or it may be removably coupled to the different work vehicle as a tow-behind assembly. In the illustrated embodiment, the baler 138 includes a plurality of belts 140 routed around corresponding baling rollers 142. The belts 140 and rollers 142 compress the crop material C1 into a round bale. The baler 138 further includes a wrapping system 144. Once the round bale has been formed, the baler 138 wraps the bale with a wrap material 146 by operation of the wrapping system 144. After the round bale has been sufficiently wrapped by the wrapping system 144, the baler 138 ejects the wrapped round bale and later begins forming a new round bale.

In the illustrated embodiment, the accumulator 118 continues to receive crop material C1 while the baler 138 forms and subsequently wraps the round bale. Typically, the round bale can require up to four full batches of crop material C1 from the accumulator 118 to form the round bale. In order to optimize power utilization of the harvester 100, the baler 138 only actively operates to form the round bale while the accumulator 118 is unloading its batch of crop material C1. Further, the feed conveyor 130, in conjunction with the accumulator 118, only operates to unload the entire batch of crop material C1 until the accumulator 118 is low or nearly empty. Generally speaking, the accumulator 118 is almost never completely empty due to the continuous operation of the harvester 100 and, thus, the continuous introduction of new crop material C1 into the accumulator inlet 122 via the duct 116. The accumulator 118 is allowed to fill completely or nearly completely with crop material C1 before it is emptied. Once the accumulator 118 is full or nearly full with crop material C1, the metering rollers 128, beater rollers 131, and feed rollers 132 operate to transport the crop material C1 to the baler 138 until the accumulator 118 is again empty or nearly empty of crop material C1.

Because the harvesting operation of the harvester 100 is preferably continuous, it is desirable to wrap and eject the round bale of crop material C1 immediately after the metering rollers 128 and/or feed conveyor 130 stops. In this manner, the baler 138 and the wrapping system 144 have the most time possible to operate until the accumulator 118 is full or nearly full and must be emptied again by operation of the metering rollers 128. Ideally, an operator will not need to halt the forward progression of the harvester 100 in the direction D1 while the round bale is wrapped by the wrapping system 144 and the round bale is subsequently ejected from the baler 138.

In order to provide the wrapping system 144 sufficient time to wrap the round bale of crop material C1 and the baler 138 sufficient time to eject the wrapped round bale of crop material C1, it is important to identify the low or empty condition of the accumulator 118 with adequate accuracy. Optical systems positioned within the storage frame 120 of the accumulator 118 can be subject to inaccuracies due to uneven filling of the accumulator 118 with crop material C1. Further, voids may form in the crop material C1 within the storage frame 120, which can also cause inaccuracies in an optical measurement system or other systems that measure the vertical position of the top of the accumulation of crop material C1 within the storage frame 120. A false detection of a low or empty condition of the accumulator 118, for instance, could greatly reduce the amount of time the wrapping system 144 has to wrap the round bale of crop material C1 and the baler 138 has to eject the wrapped round bale of crop material C1. Further, operation of the metering rollers 128 and feed rollers 132 during a low or empty condition of the accumulator 118 would be an unnecessary waste of fuel/energy.

Figure 2:
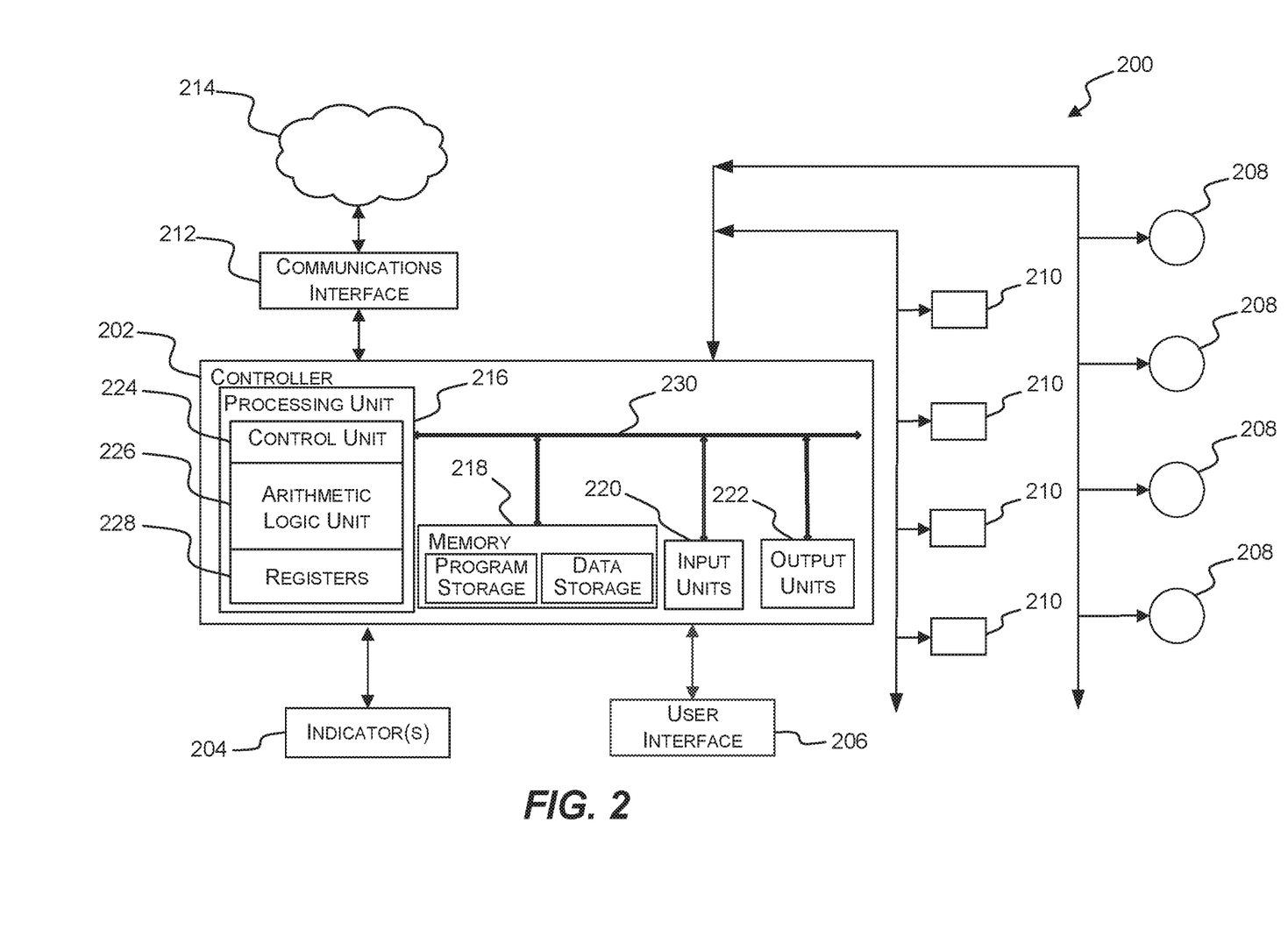
FIG. 2 illustrates a controller for the system of FIG. 1.

The illustrated harvester 100 includes an accumulator contents detection system 200 as shown in FIG. 2. The accumulator contents detection system 200 includes a controller 202 electrically and/or communicatively connected to a variety of modules or components of the system 200. For example, the illustrated controller 202 is connected to one or more indicators 204 (e.g., light-emitting diodes [LEDs], a liquid crystal display [LCD], or the like), a user input or user interface 206 (e.g., a user interface of a user device or of a control panel in the operator station 108 in FIG. 1), a drive unit 208, and a sensor 210.

In some embodiments, a communications interface 212 is electrically and/or communicatively connected to the controller 202 to enable the controller 202 to connect to a network 214. This connection to a network 214 allows the controller 202 to communicate with a user device, a server, or the like.

The controller 202 includes combinations of hardware and software that are operable to, among other things, control the operation of the harvester 100, the accumulator contents detection system 200, other subsystems of the harvester 100 such as the baler 138 and/or the wrapping system 144, or the like. In some embodiments, the controller 202 is electrically and/or communicatively connected to one or more drive units 208. The drive units 208 (described in more detail below) are configured to directly or indirectly drive at least one drive metering roller 129. Some embodiments include additional or alternative drive units 208 configured to directly or indirectly drive at least one beater roller 131, at least one feed roller 134, at least one compactor auger 126, or the like.

The controller 202 is also electrically and/or communicatively connected to one or more sensors 210. These sensors 210 are configured to directly or indirectly detect a load transmitted to at least one metering roller 128. Some embodiments include additional or alternative sensors 210 configured to directly or indirectly detect a load transmitted to at least one beater roller 131, at least one drive feed roller 134, at least one compactor auger 126, or the like.

The controller 202 is operable to receive one or more signals from the sensor 210, control operation of the drive unit 208, communicate over the network 214, receive input from a user via the user interface 206, provide information to a user via the indicators 204, etc. The indicators 204 may indicate, for instance, a status of a remaining volume of crop material C1 in the accumulator 118 based on the load detected directly or indirectly by the sensor 210. In some embodiments, the indicators 204 and the user interface 206 are integrated together in the form of, for instance, a touch-screen. In other embodiments, the indicator 204 is a single light configured to illuminate if the load detected directly or indirectly by the sensor 210 is below a threshold amount.

The connections described herein are, for example, wired connections, wireless connections, or a combination of wired and wireless connections. In embodiments including utilization of a network 214, the network 214 is, for example, a wide area network (WAN) (e.g., a TCP/IP based network), a local area network (LAN), a neighborhood area network (NAN), a home area network (HAN), or personal area network (PAN) employing any of a variety of communications protocols, such as Wi-Fi, Bluetooth, ZigBee, etc. In some implementations, the network 214 is a cellular network, such as, for example, a Global System for Mobile Communications (GSM) network, a General Packet Radio Service (GPRS) network, a Code Division Multiple Access (CDMA) network, an Evolution-Data Optimized (EV-DO) network, an Enhanced Data Rates for GSM Evolution (EDGE) network, a 3GSM network, a 4GSM network, a 4G LTE network, a 5G New Radio, a Digital Enhanced Cordless Telecommunications (DECT) network, a Digital AMPS (IS-136/TDMA) network, or an Integrated Digital Enhanced Network (iDEN) network, etc.

The controller 202 includes a plurality of electrical and electronic components that provide power, operational control, and protection to the components and modules within the controller 202 and/or the system 200. For example, the controller 202 includes, among other things, a processing unit 216 (e.g., a microprocessor, a microcontroller, or another suitable programmable device), a memory 218, input units 220, and output units 222. The processing unit 216 includes, among other things, a control unit 224, an arithmetic logic unit (ALU) 226, and a plurality of registers 228 (shown as a group of registers in FIG. 2), and is implemented using a known computer architecture (e.g., a modified Harvard architecture, a von Neumann architecture, etc.). The processing unit 216, the memory 218, the input units 220, and the output units 222, as well as the various modules or circuits connected to the controller 202 are connected by one or more control and/or data buses (e.g., common bus 230). The control and/or data buses are shown generally in FIG. 2 for illustrative purposes. The use of one or more control and/or data buses for the interconnection between and communication among the various modules, circuits, and components would be known to a person skilled in the art in view of the embodiments described herein.

The memory 218 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 216 is connected to the memory 218 and executes software instructions that are capable of being stored in a RAM of the memory 218 (e.g., during execution), a ROM of the memory 218 (e.g., on a generally permanent basis), or another non-transitory computer readable medium such as another memory or a disc. Software included in the implementation of the system 200 and controller 202 can be stored in the memory 218 of the controller 202. The software includes, for example, firmware, one or more applications, program data, filters, rules, one or more program modules, and other executable instructions. The controller 202 is configured to retrieve from the memory 218 and execute, among other things, instructions related to the control processes and methods described herein. In other embodiments, the controller 202 includes additional, fewer, or different components.

The user interface 206 is included to provide user control of the harvester 100, the system 200, the drive unit 208, and/or the sensor 210. The user interface 206 is operably coupled to the controller 202 to control, for example, control or drive signals provided to the drive unit 208. In such embodiments, a user may initiate a manual override of the program operating the system 200. The user interface 206 can include any combination of digital and analog input devices required to achieve a desired level of control of the harvester 100, the system 200, some combination thereof, or the like. For example, the user interface 206 can include a computer having a display and input devices, a touch-screen display, a plurality of knobs, dials, switches, or the like. In the embodiment illustrated in the Figures, the user interface 206 is incorporated into the controls found in the operator station 108. In other embodiments, the user interface 206 may be incorporated into a user device not incorporated into the controls of the operator station 108, such as a smartphone, a tablet, a computer, or the like.

Figure 3:
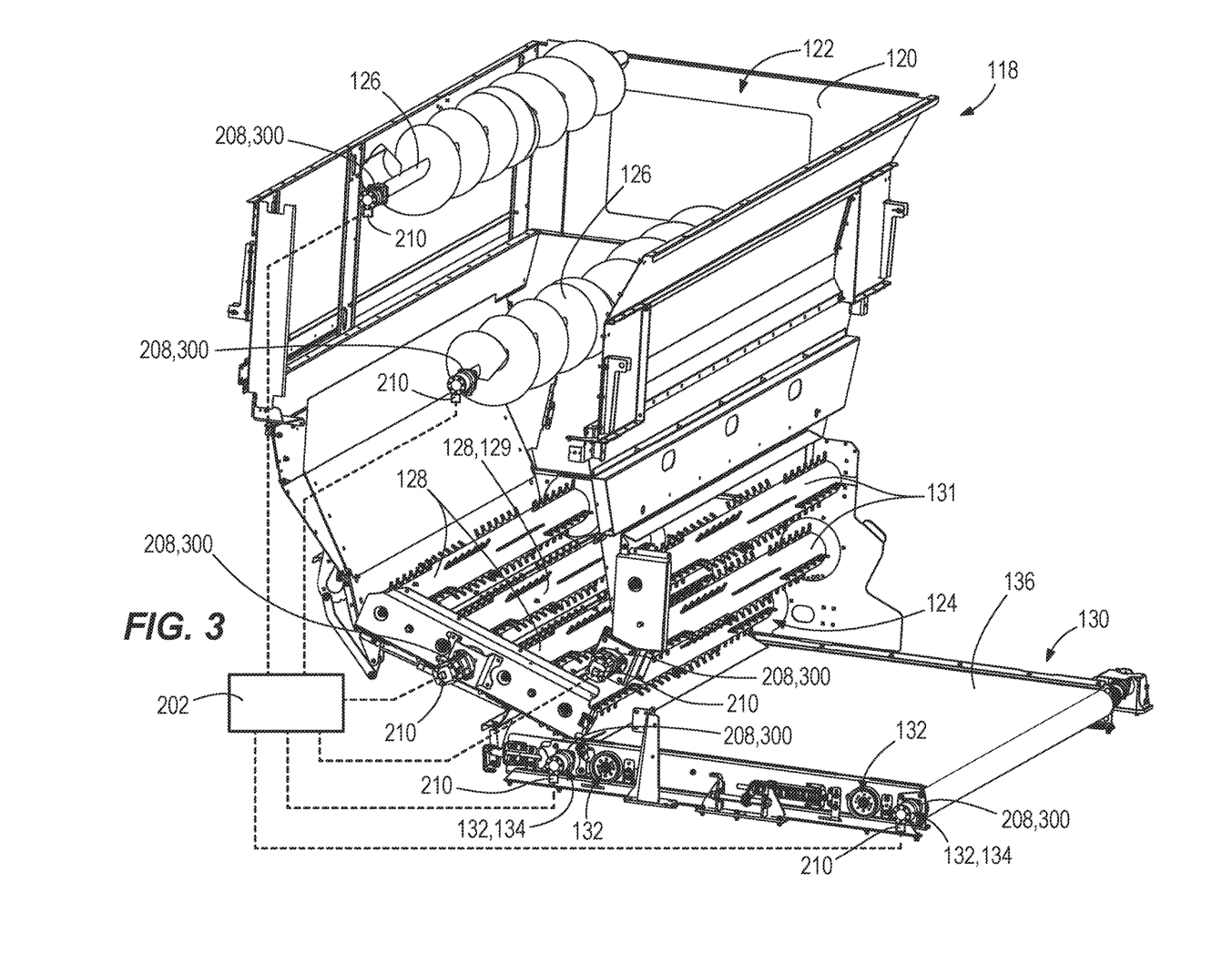
FIG. 3 illustrates a detailed perspective view of an embodiment of an accumulator contents detection system.

With reference to FIG. 3, some embodiments of the harvester 100 and the accumulator contents detection system 200 include drive units 208 in the form of electric motors 300. In the embodiment shown in FIG. 3, each of the compactor augers 126, the metering rollers 128, the beater rollers 131, and the feed rollers 132 is driven either directly or indirectly by an electric motor 300. The sensors 210 include current sensors configured to detect a current draw of the respective electric motors 300. In some embodiments, only the electric motor 300 driving the drive metering roller 129 has a current sensor 210 associated therewith to monitor the current draw. The controller 202 is communicatively coupled to the current sensors 210, thereby being capable of monitoring how much current is required to operate the electric motors 300 at the predetermined speed.

If the electric motor 300 driving, for instance, the drive metering roller 129 requires a relatively large current draw that is above a predetermined threshold value, the controller 202 is capable of correlating this event to a condition of an accumulator 118 that is full or nearly full of crop material C1. If the electric motor 300 driving the drive metering roller 129 requires a relatively small current draw that is below a predetermined threshold value, the controller 202 is capable of correlating this event to a condition of an accumulator 118 that is empty or nearly empty of crop material C1. The controller 202 is also communicatively coupled to the electric motors 300, such that the controller 202 is configured to continue running the electric motors 300 if the current draw is above a predetermined threshold value and is configured to stop the electric motors 300 if the current draw is below a predetermined threshold value.

In some embodiments, the controller 202 further includes a timer to determine when to start up the electric motors 300 once more. In other embodiments, the controller 202 continues running one or more of the electric motors 300, such as the electric motor 300 driving the compactor auger 126 located highest in the storage frame 120 of the accumulator 118. Once the current sensor 210 associated with the highest compactor auger 126 returns a reading of a current draw across the corresponding electric motor 300 that is above a predetermined threshold value, the controller 202 is capable of correlating this event to a condition of the accumulator 118 being once more full or nearly full of crop material C1.

Figure 4:
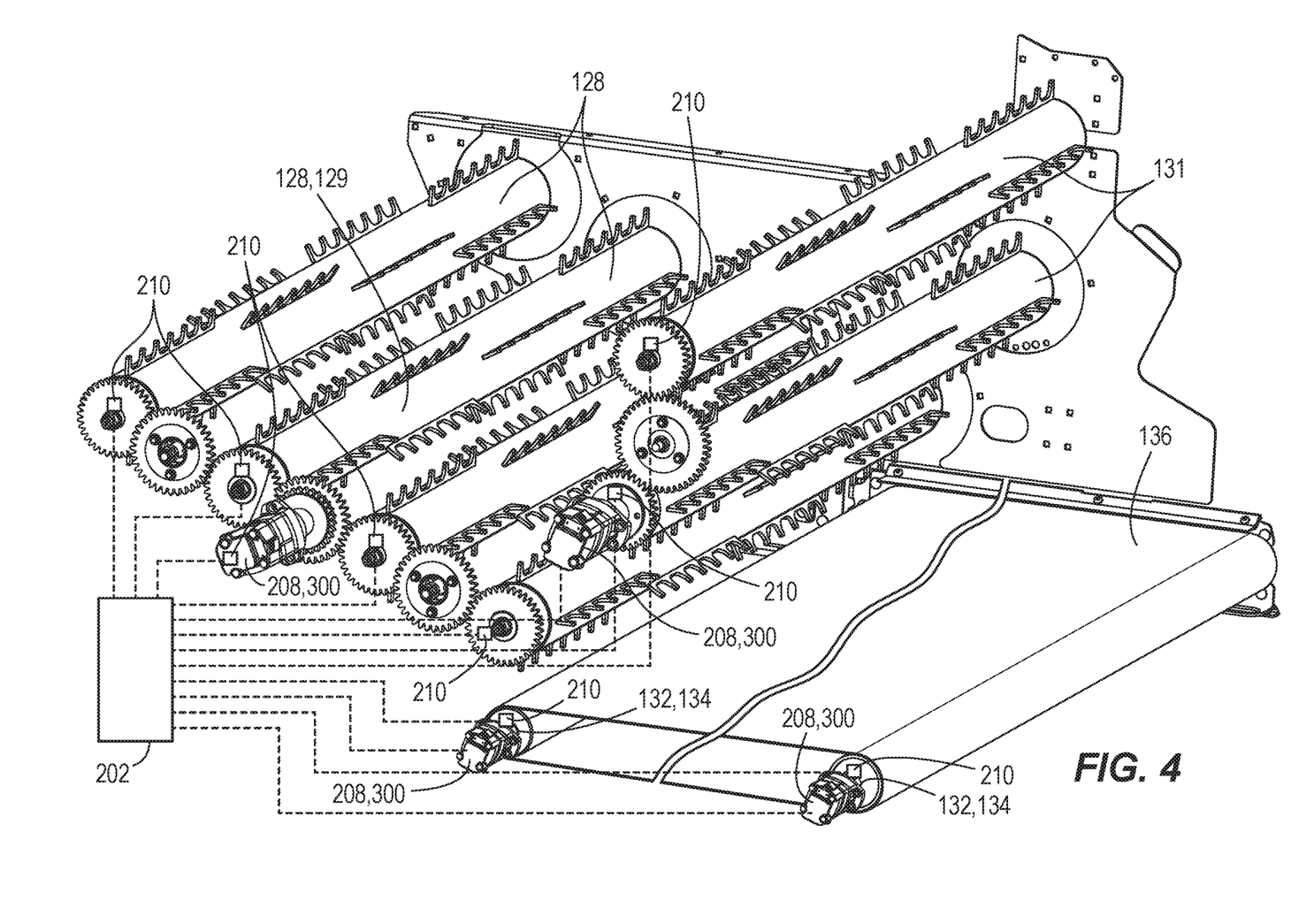
FIG. 4 illustrates a detailed perspective view of another embodiment of an accumulator contents detection system.

With reference to FIG. 4, some embodiments of the harvester 100 and the accumulator contents detection system 200 include sensors 210 that are independent of the drive units 208. In the illustrated embodiment of FIG. 4, the sensors 210 schematically represent torque sensors. The drive metering roller 129, for instance, includes a torque sensor 210 that is coupled thereto. Other components of the harvester 100 may further include torque sensors 210, such as the compactor auger 126, other metering rollers 128, the beater rollers 131, the drive feed rollers 134, other feed rollers 132, or the like. Although it does not matter which type of drive unit 208 is used in the embodiment of FIG. 4, electric motors 300 are illustrated as an example. As illustrated in FIG. 4, the torque sensor 210 can be coupled to the roller that is directly coupled to an electric motor 300, or the torque sensor 210 may be coupled to a roller that is indirectly driven by an electric motor 300.

The controller 202 is communicatively coupled to the torque sensors 210, thereby being capable of monitoring how much torque is transmitted to the rollers, such as the drive metering roller 129. If the torque sensor 210 coupled to, for instance, the drive metering roller 129 detects a relatively large torque value that is above a predetermined threshold value, the controller 202 is capable of correlating this event to a condition of an accumulator 118 that is full or nearly full of crop material C1. If the torque sensor 210 coupled to the drive metering roller 129 detects a relatively small torque value that is below a predetermined threshold value, the controller 202 is capable of correlating this event to a condition of an accumulator 118 that is empty or nearly empty of crop material C1. The controller 202 is also communicatively coupled to the electric motors 300, such that the controller 202 is configured to continue running the electric motors 300 if the torque value is above a predetermined threshold value and is configured to stop the electric motors 300 if the torque value is below a predetermined threshold value.

With reference to FIGS. 5-8, some embodiments of the harvester 100 and the accumulator contents detection system 200 include a hydraulic system 500. The hydraulic system 500 includes a hydraulic pump 502 and a hydraulic fluid reservoir 504. The hydraulic system 500 further includes hydraulic motors 506 driven by the hydraulic pump 502. The hydraulic pump 502 sends hydraulic fluid through the fluid lines 508 to pass through the hydraulic motors 506, thereby turning one or more gears within the hydraulic motors 506. The hydraulic motors 506 are coupled to, for instance, the compactor augers 126, the metering rollers 128, the drive metering roller 129, the beater rollers 131, the feed rollers 132, and/or the drive feed rollers 134.

Also shown in the embodiment of FIGS. 5-8, the sensors 210 are pressure sensors configured to detect a pressure of the hydraulic fluid in the fluid lines 508. In some embodiments, the pressure sensors 210 are differential pressure sensors configured to detect a pressure drop across the hydraulic motor 506 or across the hydraulic pump 502. Other embodiments may simply include a plurality of pressure sensors 210 with the controller 202 calculating a pressure drop by comparing the values of the pressure sensors 210 located on both upstream and downstream sides of the hydraulic motor 506 or the hydraulic pump 502.

Figure 5:
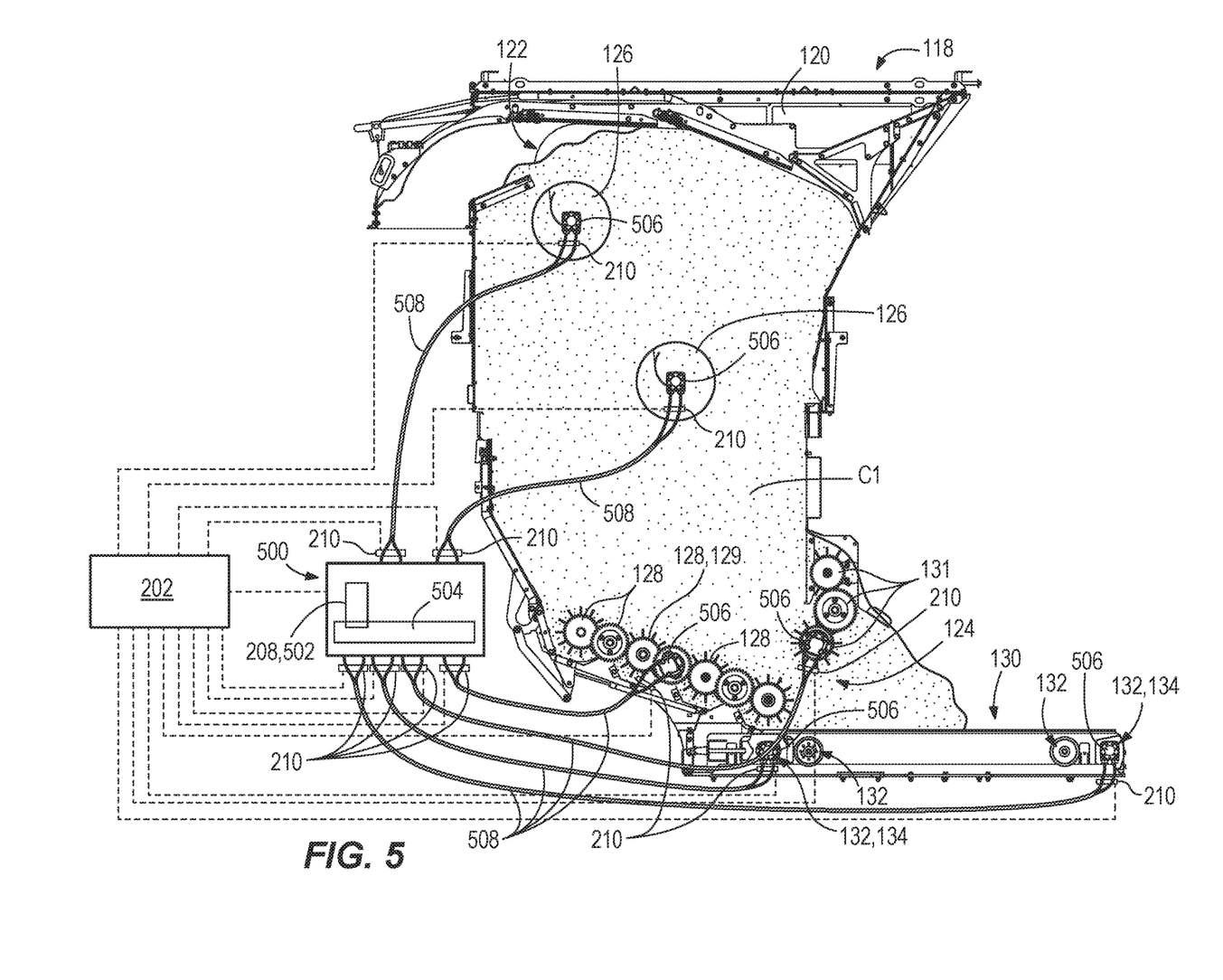
FIG. 5 illustrates a detailed perspective view of another embodiment of an accumulator contents detection system with the accumulator full or nearly full of crop material.
Figure 6:
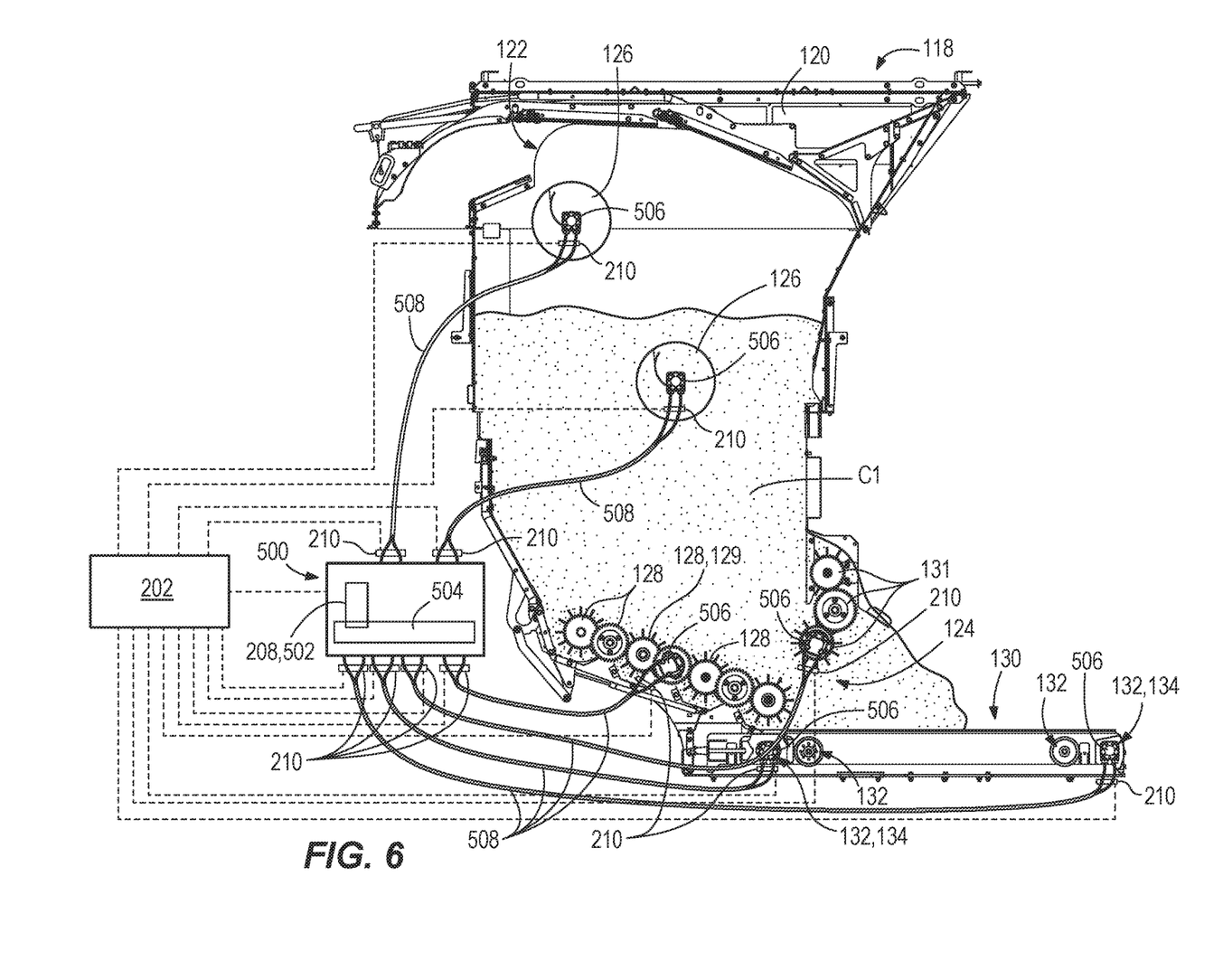
FIG. 6 illustrates the system of FIG. 5 with the accumulator less full than in FIG. 5.
Figure 7:
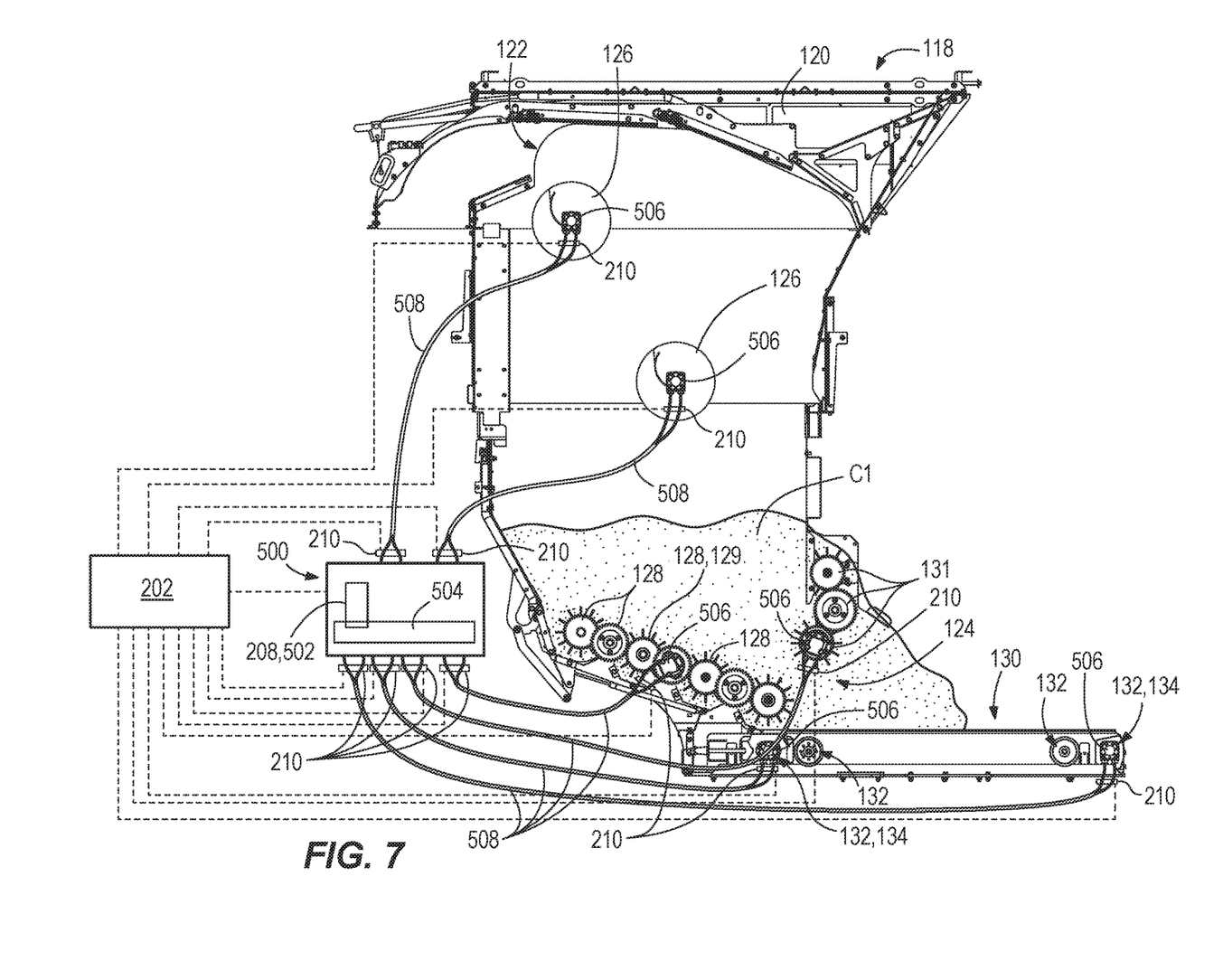
FIG. 7 illustrates the system of FIG. 5 with the accumulator less full than in FIG. 6.
Figure 8:
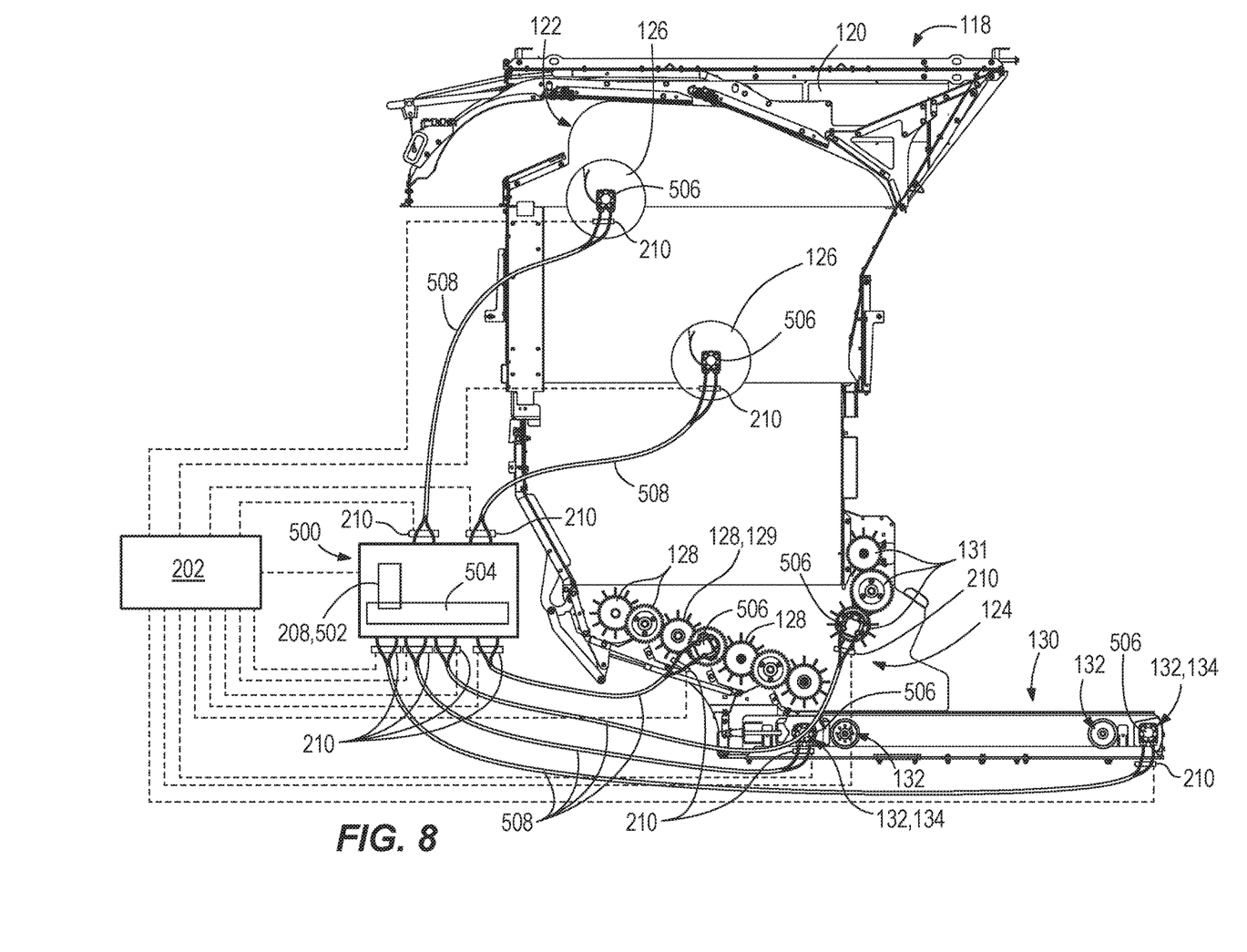
FIG. 8 illustrates the system of FIG. 5 with the accumulator empty or nearly empty of crop material.

In the embodiment of FIGS. 5-8, the controller 202 is communicatively coupled to the hydraulic pump 502 and to the pressure sensors 210. The controller 202 is thereby capable of monitoring how much hydraulic pressure is required to operate the hydraulic motor 506 and/or the hydraulic pump 502. If the pressure sensors 210 detect a relatively large pressure drop that is above a predetermined threshold value for the pressure drop across the hydraulic motor 506 driving the drive metering roller 129, for instance, the controller 202 is capable of correlating this event to a condition of an accumulator 118 that is full or nearly full of crop material C1 (as shown in FIG. 5). If the pressure sensors 210 detect a relatively small pressure drop that is below a predetermined value for the pressure drop across the hydraulic motor 506 driving the drive metering roller 129, the controller 202 is capable of correlating this event to a condition of an accumulator 118 that is empty or nearly empty of crop material C1 (as shown in FIG. 8). Because the controller 202 is also communicatively coupled to the hydraulic pump 502, the controller 202 is configured to continue running the hydraulic pump 502 (and thus the hydraulic motors 506) if the pressure drop is above a predetermined threshold value and is configured to stop the hydraulic pump 502 (and thus the hydraulic motors 506) if the pressure drop is below a predetermined threshold value.

As discussed above with regard to the other embodiments, the embodiment of FIGS. 5-8 may further include the controller 202 including a timer to determine when to start up the hydraulic pump 502 once more. In some embodiments, the hydraulic system 500 includes one or more valves operated by the controller 202, such that some rollers may stop operating while other rollers may continue operating regardless of how empty the accumulator 118 becomes. For instance, the hydraulic system 500 may always operate the hydraulic motor 506 driving the compactor auger 126 located highest in the storage frame 120 of the accumulator 118. Once the pressure sensors 210 detect a pressure drop across the hydraulic motor 506 driving the highest compactor auger 126 that is above a predetermined threshold value, the controller 202 is capable of correlating this event to a condition of the accumulator 118 being once more full or nearly full of crop material C1. The controller 202 can then resume operation of the hydraulic motor 506 driving the drive metering roller 129 to empty the accumulator 118 once more. In such embodiments, the controller 202 would not start the hydraulic motor 506 driving the drive metering roller 129 if the accumulator 118 had refilled only to the level shown in FIG. 6, but would start the hydraulic motor 506 driving the drive metering roller 129 if the accumulator 118 had refilled to the level shown in FIG. 5.

Some embodiments including the hydraulic system 500 may have the sensors 210 that additionally or alternatively include one or more temperature sensors to monitor the temperature of the hydraulic fluid. These temperature sensors 210 can be in addition to the pressure sensors 210 as a way to verify accuracy of the pressure sensors 210, since the temperature of the hydraulic fluid changes as the pressure of the hydraulic fluid changes.

Some embodiments contemplated herein additionally or alternatively include one or more sensors associated with the baler 138 to monitor a diameter of the bale of crop material C1 to indirectly determine an empty or nearly empty condition of the accumulator 118. In some embodiments, one or more sensors associated with the baler rollers 142 used in monitoring characteristics of the baler 138 can further be used to monitor the size of the bale of crop material C1. These sensors may typically be used for monitoring the belt 140 tension or some other parameter, but the data gathered by these (and potentially additional) sensors can be correlated to the size of the bale of crop material C1 being formed by the baler 138. The change of the size of the bale of crop material C1 over time can indicate how much crop material C1 is being fed to the baler 138 from the accumulator 118, thereby indirectly indicating a fill level of the crop material C1 in the accumulator 118. Correction factors can be implemented in calculations to account for the delay between the time the crop material C1 leaves the accumulator 118 and the time the rate of change in size of the bale of crop material C1 changes. Trend lines can be calculated using the changes in bale formation speed to estimate successive accumulator 118 empty times. Additionally or alternatively, the baler 138, the feed conveyor 130, and the metering rollers 128 can be made to stop when the change in size of the bale of crop material C1 is below a threshold rate. Once the accumulator 118 is detected to be full again using, for instance, the highest compactor auger 126 in the accumulator 118, the metering rollers 128, the feed conveyor 140, and the baler 138 can be started up once more.

Still further embodiments contemplated herein additionally or alternatively include one or more sensors measuring motor speed, weight of the entire accumulator and contents therein, load characteristics on the feed rollers 132, load characteristics on the compactor augers 126, load characteristics on the beater rollers 131, load characteristics on the baler rollers 142, some combination thereof, or the like.

Figure 9:
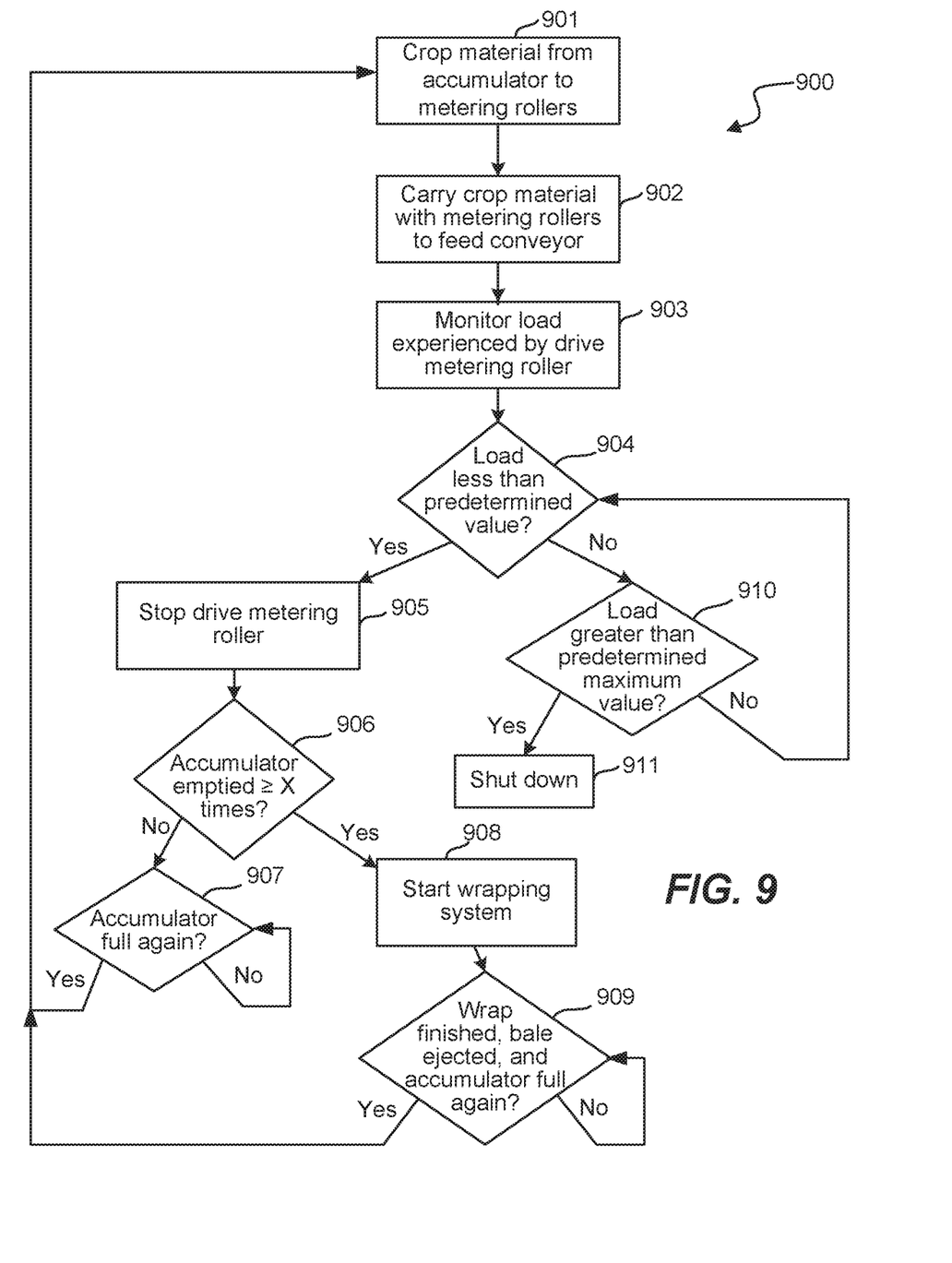
FIG. 9 illustrates a method of operating the harvester of FIG. 1.

As shown in FIG. 9, the harvester 100 and system 200 may operate according to a method 900 to meter the crop material C1 of the accumulator 118 and thereby control the harvester 100. First, the metering rollers 128 receive crop material C1 from the accumulator 118 (step 901). The crop material C1 is carried by the metering rollers 128 to be metered to the feed conveyor 130 (step 902). A quantity of crop material C1 carried by the metering rollers 128 is indirectly detected by monitoring a load transmitted to the drive metering roller 129 (step 903). The load transmitted to the drive metering roller 129 is compared to a predetermined range (step 904). If the controller 202 determines the load transmitted to the drive metering roller 129 is less than a predetermined threshold value, the controller 202 causes the drive metering roller 129 (and, optionally, also the feed conveyor 130) to stop (step 905). The method 900 further includes the controller 202 determining how many times the accumulator 118 has emptied (or how many times the drive metering roller 129 has stopped, etc.) (step 906). If the controller 202 has determined the accumulator 118 has not emptied greater than or equal to the threshold number of times that correlates to a complete round bale, the method 900 continues with the controller 202 determining if the accumulator 118 is full once more (step 907). If the accumulator 118 is full or nearly full once more, the method 900 continues by returning to step 901. If the accumulator 118 is not yet full or nearly full again, the method 900 continues the inquiry at step 907 either continuously or periodically.

Returning to the inquiry at step 906, if the controller 202 has determined the accumulator 118 has emptied greater than or equal to the threshold number of times, the method 900 proceeds with starting the wrapping system 144 (step 908). Step 908 may also include resetting the counter in the controller 202 for monitoring the number of times the accumulator 118 has emptied. The method 900 further includes inquiring whether the wrapping system 144 has finished wrapping and whether the accumulator 118 is full or nearly full once more (step 909). If the wrapping system 144 has finished wrapping, the baler 138 has ejected the bale, and the accumulator 118 is full again, the method 900 continues by returning to step 901. If the wrapping system 144 is not finished wrapping, the baler 138 has not yet ejected the bale, or the accumulator 118 is not yet full again, the method 900 continues the inquiry at step 909 either continuously or periodically.

If the wrapping system 144 has finished prior to the accumulator 118 filling again, the wrapping system 144 does not continue wrapping and the bale is ejected from the baler 138. If the accumulator 118 is full again and the wrapping system 144 is not finished and/or the bale has not yet been ejected from the baler 138, the user must stop the harvester 100 moving in the forward direction D1 until the bale has been ejected from the baler 138. In such a scenario, the controller 202 may alert the user via, for instance, the indicators 204 that the harvester 100 must be halted for a period of time. In some embodiments, the controller 202 may further alert the user via, for instance, the indicators 204 that the harvester 100 may again be moved in the forward direction D1 after the bale has been ejected from the baler 138.

Returning to the inquiry at step 904, if the controller 202 determines the load transmitted to the drive metering roller 129 is greater than the predetermined threshold value, the method 900 continues with the controller inquiring whether the load transmitted to the drive metering roller 129 is greater than a predetermined maximum value (step 910). If the load transmitted to the drive metering roller 129 is greater than the predetermined maximum value, the controller causes the drive metering roller 129 (and, optionally, also the feed conveyor 130) to shut down and alerts the user of a problem with the harvester 100 (step 911).

Returning to the inquiry at step 910, if the controller 202 determines the load transmitted to the drive feed roller 134 is less than the predetermined maximum value, the controller 202 deems the conditions safe to continue and the method 900 continues with the controller 202 causing the drive metering roller 129 to be driven. The inquiry at step 904 may be made continuously or periodically.

Thus, embodiments described herein provide methods and systems for operating an accumulator contents detection system for a harvester. Various features and advantages of some embodiments are set forth in the following claims.

The invention claimed is:

1. An accumulator contents detection system for a harvester, the system comprising:
    an accumulator configured to accumulate crop material;
    a plurality of metering rollers configured to receive crop material from the accumulator, the metering rollers including a drive metering roller;
    at least one sensor configured to detect a load transmitted to the drive metering roller;
    a controller communicatively coupled to the at least one sensor, an indicator communicatively coupled to the controller and configured to indicate the load detected by the at least one sensor is below a threshold amount;
a baler configured to receive crop material from the accumulator to form a bale of crop material, the baler including a wrapping system to wrap the bale of crop material, and
wherein the controller is communicatively coupled to the wrapping system and configured to transmit a signal to start operation of the wrapping system to wrap the bale of crop material if the load detected by the at least one sensor is below the threshold amount.

2. The system of claim 1, further comprising
a controller communicatively coupled to the at least one sensor,
a hydraulic system including a hydraulic motor coupled to the drive metering roller and configured to be driven by a hydraulic pump, and
wherein the at least one sensor is in the form of a pressure sensor configured to detect hydraulic pressure in the hydraulic system.

3. The system of claim 2, wherein the controller is communicatively coupled to the hydraulic pump and configured to transmit a signal to cease operation of the hydraulic pump if the hydraulic pressure detected by the pressure sensor is outside of a predetermined range.

4. The system of claim 3, wherein the hydraulic pressure detected by the pressure sensor includes at least one of a hydraulic pressure upstream of the hydraulic motor, and a hydraulic pressure downstream of the hydraulic motor.

5. The system of claim 4, wherein the pressure sensor is in the form of a differential pressure sensor configured to detect a pressure drop across the hydraulic motor.

6. The system of claim 1, further comprising
a controller communicatively coupled to the at least one sensor,
an electric motor coupled to the drive metering roller, and
wherein the at least one sensor is in the form of a current sensor configured to detect a current draw of the electric motor.

7. The system of claim 6, wherein the controller is communicatively coupled to the electric motor and configured to transmit a signal to cease operation of the electric motor if the current draw of the electric motor is below a predetermined threshold value.

8. The system of claim 1, further comprising
a controller communicatively coupled to the at least one sensor, and
wherein the at least one sensor is in the form of a torque sensor coupled to the drive metering roller.

9. The system of claim 8, further comprising
a drive unit driving the drive metering roller, and
wherein the controller is communicatively coupled to the drive unit and configured to transmit a signal to cease operation of the drive unit if a torque detected by the torque sensor is below a predetermined threshold value.

10. A harvester comprising the system of claim 1, the harvester including
a chassis,
an operator station supported by the chassis,
a harvesting header coupled to the chassis,
a duct in communication with the harvesting header, the duct configured to deliver crop material from the harvesting header to the accumulator, and
wherein the accumulator and the metering rollers are supported by the chassis.

11. A method of metering crop material from an accumulator of a harvester, the method comprising:
receiving crop material from the accumulator to a plurality of metering rollers;
conveying crop material with the metering rollers; and
detecting a load transmitted to a drive metering roller of the metering rollers;
comparing the load transmitted to the drive metering roller to a first threshold;
stopping the drive metering roller if the load transmitted to the drive metering roller is less than the first threshold;
determining a number of times the drive metering roller has been stopped; and
comparing the number of times the drive metering roller has been stopped to a second threshold.

12. The method of claim 11,
wherein if the load transmitted to the drive metering roller is greater than the first threshold, maintaining operation of the drive metering roller.

13. The method of claim 12, further comprising wrapping a bale of crop material while the drive metering roller is stopped and the number of times the drive metering roller has been stopped is greater than the second threshold.

14. The method of claim 13, further comprising ejecting the bale of crop material after wrapping the bale of crop material is complete and while the drive metering roller is stopped.

15. The method of claim 14, further comprising resuming operation of the drive metering roller after wrapping the bale of crop material and ejecting the bale of crop material is complete.

16. The method of claim 11, wherein, if the number of times the drive metering roller has been stopped is less than the second threshold, maintain stopping the drive metering roller and determine if the accumulator is full of crop material.

17. An accumulator contents detection system for a harvester, the system comprising:
an accumulator comprising a frame defining an interior having an inlet configured to receive crop material and an outlet configured to discharge the crop material;
an auger located in the interior of the accumulator, the auger configured to compact the crop material;
a plurality of metering rollers located in the interior and configured to convey the crop material from the accumulator through the outlet, the plurality of metering rollers including a drive metering roller;
a first drive unit for operably driving the auger and a second drive unit for operably driving the drive metering roller;
a controller for controlling the first drive unit and the second drive unit;
a first sensor disposed in communication with the controller, the first sensor detecting an operating condition of the first drive unit;
a second sensor disposed in communication with the controller, the second sensor detecting an operating condition of the second drive unit;
wherein, the controller is configured to receive the operating condition of the first drive unit from the sensor and compare the operating condition to a threshold;
wherein, if the operating condition of the first drive unit exceeds the threshold, the controller determines the accumulator is full of crop material.

18. The system of claim 17, wherein the first sensor is located at a first height in the interior of the accumulator and the second sensor is located at a second height in the interior thereof, the first height being greater than the second height.

19. The system of claim 17, wherein the first sensor is located adjacent the inlet and the second sensor is located adjacent the outlet.

20. The system of claim 17, wherein, if the operating condition of the first drive unit is less than the threshold, the controller determines the accumulator is not full of crop material.

21. The system of claim 20, wherein the controller operably controls the second drive unit to stop driving the drive meter roller when the operating condition of the first drive unit is less than the threshold.

22. The system of claim 17, wherein the controller operably controls the second drive unit to operably drive the drive meter roller when the operating condition of the first drive unit is greater than the threshold.

* * * * *